United States Patent
Roy et al.

(10) Patent No.: US 10,687,204 B1
(45) Date of Patent: Jun. 16, 2020

(54) INTELLIGENT SIM PROFILE PROCUREMENT

(71) Applicant: T-Mobile USA, Inc., Bellevue, WA (US)

(72) Inventors: Tanmay Roy, Redmond, WA (US); Cristian Asandului, Snoqualmie, WA (US); Kyeong Hun An, Sammamish, WA (US); Phani Ramisetty, Sammamish, WA (US); Mathew George, Krikland, WA (US); Ryan King, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/417,436

(22) Filed: May 20, 2019

(51) Int. Cl.
| | |
|---|---|
| *H04W 8/18* | (2009.01) |
| *H04L 29/06* | (2006.01) |
| *G06K 19/06* | (2006.01) |
| *G06F 21/73* | (2013.01) |
| *H04L 29/08* | (2006.01) |
| *H04B 1/3816* | (2015.01) |

(52) U.S. Cl.
CPC ............ *H04W 8/183* (2013.01); *G06F 21/73* (2013.01); *G06K 19/06037* (2013.01); *H04B 1/3816* (2013.01); *H04L 63/0853* (2013.01); *H04L 67/26* (2013.01)

(58) Field of Classification Search
CPC ....... H04W 8/183; H04W 8/205; H04W 4/50; H04W 4/60; H04W 8/18; H04W 88/06; H04W 8/265; H04W 48/18; H04W 12/00514; H04W 8/20

See application file for complete search history.

(56) References Cited

U.S. PATENT DOCUMENTS

| | | | |
|---|---|---|---|
| 9,572,016 B2 * | 2/2017 | Cormier | H04L 63/0823 |
| 9,712,996 B2 * | 7/2017 | Park | H04W 12/00401 |
| 9,831,903 B1 * | 11/2017 | Narasimhan | H04W 4/24 |
| 10,321,303 B1 * | 6/2019 | Namiranian | H04W 40/04 |
| 2010/0203864 A1 * | 8/2010 | Howard | H04W 12/0023 455/411 |
| 2010/0311402 A1 * | 12/2010 | Srinivasan | H04W 8/183 455/418 |
| 2010/0311404 A1 * | 12/2010 | Shi | H04W 8/205 455/419 |
| 2013/0301617 A1 * | 11/2013 | Kuhn | H04W 36/0085 370/331 |

(Continued)

*Primary Examiner* — Dung Hong
(74) *Attorney, Agent, or Firm* — Han Santos, PLLC (57) ABSTRACT

A mobile network operator (MNO) may receive a request to provide an embedded Subscriber Identity Module (eSIM) profile to an embedded Universal Integrated Circuit Card (eUICC) of a user device. The user device is configured to receive telecommunication services from the MNO. Thus, if it is determined that a particular remote SIM provisioning (RSP) platform of a plurality of RSP platforms is able to provide the eSIM profile, the particular RSP platform is directed to provision the eUICC of the user device with the eSIM profile. However, if a condition that affects an ability of the particular RSP platform to provide the eSIM profile is detected, an alternative RSP platform may be directed to provide the eUICC of the user device with the eSIM profile.

20 Claims, 6 Drawing Sheets

(56) References Cited

U.S. PATENT DOCUMENTS

| | | | |
|---|---|---|---|
| 2014/0140507 A1* | 5/2014 | Park | H04W 8/245 380/247 |
| 2014/0308991 A1* | 10/2014 | Lee | H04W 8/183 455/558 |
| 2015/0110035 A1* | 4/2015 | Lee | H04W 8/183 370/329 |
| 2015/0305004 A1* | 10/2015 | Ohta | H04W 16/04 370/330 |
| 2016/0020802 A1* | 1/2016 | Lee | H04B 1/3816 455/558 |
| 2016/0094930 A1* | 3/2016 | Ramanna | H04W 8/205 455/558 |
| 2016/0119780 A1* | 4/2016 | Jung | H04W 8/265 455/419 |
| 2016/0183081 A1* | 6/2016 | Flores Cuadrado | H04W 12/04 455/558 |
| 2016/0283216 A1* | 9/2016 | Gao | H04W 12/0401 |
| 2016/0302070 A1* | 10/2016 | Yang | H04W 12/0023 |
| 2016/0316356 A1* | 10/2016 | Li | H04W 12/04 |
| 2017/0048713 A1* | 2/2017 | Guday | H04W 12/08 |
| 2017/0070878 A1* | 3/2017 | Anslot | H04W 8/24 |
| 2017/0150356 A1* | 5/2017 | Li | H04W 12/06 |
| 2017/0171742 A1* | 6/2017 | Yang | H04W 8/245 |
| 2018/0014178 A1* | 1/2018 | Baek | H04W 8/20 |
| 2018/0060199 A1* | 3/2018 | Li | G06F 11/1433 |
| 2018/0063668 A1* | 3/2018 | Li | H04L 9/0643 |
| 2018/0109942 A1* | 4/2018 | Lipovkov | H04B 1/3816 |
| 2018/0123803 A1* | 5/2018 | Park | H04W 8/205 |
| 2018/0131699 A1* | 5/2018 | Park | H04W 12/06 |
| 2018/0160294 A1* | 6/2018 | Lee | H04W 12/0023 |
| 2018/0176768 A1* | 6/2018 | Baek | H04W 8/183 |
| 2018/0242138 A1* | 8/2018 | Chen | H04W 8/24 |
| 2018/0295500 A1* | 10/2018 | Yang | H04W 8/183 |
| 2018/0302781 A1* | 10/2018 | Lee | H04W 8/20 |

\* cited by examiner

INTELLIGENT SIM PROFILE PROCUREMENT

BACKGROUND

The use of Embedded Universal Integrated Circuit Cards (eUICCs), also referred to as Embedded Subscriber Identity Modules (eSIMs), is becoming increasingly prevalent in consumer and machine-to-machine (M2M) communication fields. Unlike a traditional UICC or SIM card that exists as a removable smart card that is transferable between multiple devices, an eUICC is an integrated circuit that is not designed to be user removable, i.e., it is generally embedded with or soldered to other electronic components of a device. An eUICC may be provisioned with one or more eSIM profiles, in which each eSIM profile contains a unique international mobile subscriber identity (IMSI) number that authenticates a subscriber to a mobile network operator (MNO). Other data that are stored in the eSIM profile may include carrier network information, security authentication information, a list of accessible network services, and/or so forth. The MNO may transfer an eSIM profile to the eUICC of a user device in the form of a consumer device or an M2M device via an over-the-air (OTA) update. Consumer devices are network-capable devices that are generally marketed to individual consumers. For example, these devices may include a smartphone, a tablet computer, a smartwatch, a gaming console, and/or so forth. M2M devices are networked machines that use the telecommunication services provided by the MNO to communicate with other networked machines. For example, an M2M monitoring device that is embedded on a vehicle may automatically send vehicle tracking and operation information to a remote support device at a control center. In another example, an M2M device in the form of a smart home appliance may automatically send diagnostic information to a monitoring device at a service center in case of device malfunction. Accordingly, an MNO has to have a readily available inventory of eSIM profiles for downloading and installation into the eUICC of user devices.

MNOs generally use Remote SIM provisioning (RSP) platforms that are operated by a third-party to provision the eSIM profiles to eUICCs of user devices. In many instances, an RSP platform may be provided by an eSIM profile vendor that operates a GSM Association (GSMA)-certified data center. For example, the eSIM profile vendor may be an eUICC manufacturer (EUM), and thus is able to generate eSIM profiles for installation in the eUICCs.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques that enable an eSIM management platform of an MNO to use multiple remote SIM provisioning (RSP) platforms to provision the eUICCs of user devices with eSIM profiles. The user devices that receive the eSIM profiles are user devices that are configured to use telecommunication services provided by a wireless carrier network operated by the MNO. In some embodiments, an eSIM management platform of the entity may switch between using different RSP platforms in different scenarios. The eSIM management platform is a back-end service of an MNO that serves as a central interface between the MNO and the RSP platforms. In some instances, the MNO may provision the eUICCs user devices with eSIM profiles on behalf of a third-party partner of the MNO. For example, a third-party partner may be a mobile virtual network operator (MVNO), a Mobile Other Licensed Operator (MOLO), a network aggregator, etc. A network aggregator is a telecommunication service provider that consolidates carrier services provided by multiple wireless communication carriers into a single carrier service for offering to subscribers. In other examples, a third-party partner of the MNO may be a provider that provides content or services to the subscribers of the carrier, an M2M device vendor, an M2M device operator, and/or so forth. In various embodiments, the eSIM management platform may be equipped with an RSP manager application that manages and coordinates the switch between different RSP platforms.

In one scenario, the eSIM management platform may switch from using an initial RSP platform to an alternative RSP platform to provision eSIM profiles to the user devices when the initial RSP platform experiences a failure or is otherwise unable to perform the provisioning. In an additional scenario, the eSIM management platform may perform the switch when one or more errors have been detected in a batch of eSIM profiles provided by the initial RSP platform. In a further scenario, different RSP platforms may be configured to provide eSIM profiles to eUICCs in different types of user devices. Accordingly, the eSIM management platform may direct a particular RSP platform to provision an eSIM profile to an eUICC of a user device based on the device type of the user device. In another scenario, the eSIM management platform may initiate a rebalance of the eSIM profile provisioning performed by multiple RSP platforms when the quantity of eSIM profiles provisioned by a particular RSP platform reaches a threshold provisioning limit. In an additional scenario, the eSIM management platform may direct a specialized RSP platform to provide a user device with a machine-readable code rather than an eSIM profile, in which the machine-readable code may be subsequently used by the user device to obtain an eSIM profile for the eUICC of the user device.

In other embodiments, multiple RSP platforms may be configured to cooperatively supply eSIM profiles to the eUICCs of the user devices that receive telecommunication services from an MNO. The multiple RSP platforms may be equipped with an RSP interface mechanism that enables the platforms to communicate with one another. For example, when a first RSP platform is unable to provision a user device of the MNO with an eSIM profile, the first RSP platform may broadcast an assistance request to multiple RSP platforms. In response, a second RSP platform may respond to the assistance request and provision the eUICC of the user device instead. In another example, a first RSP platform that is running low on eSIM profiles may broadcast a request for a batch of eSIM profiles to multiple RSP platforms. In turn, a second RSP platform may respond to the request and transfer the batch of eSIM profiles to the first RSP platform. In an additional example, a first RSP platform may be unable to fulfill a particular request that is received from an eSIM management platform. The request may be to provision an eSIM profile to a particular type of user device. Alternatively, the request may be to provision a user device with a machine-readable code that can be used by the user device to acquire a corresponding eSIM profile. In such instances, the first RSP platform may broadcast an assistance request, and a second RSP platform may render assistance to the first RSP platform by fulfilling the request on behalf of the first RSP platform.

The ability of the eSIM management platform to use multiple RSP platforms to perform intelligent SIM procurement may ensure that an eSIM profile is always available for provisioning to the eUICC of a user device. Such availability may reduce or eliminate eSIM provisioning errors that arise due to RSP platform failure or downtime, corruption of eSIM profile batches, a lack of available eSIM profiles of particular types from a specific RSP platform, and/or other occurrences. The techniques described herein may be implemented in a number of ways. Example implementations are provided below with reference to the following FIGS. 1-6.

Example Architecture

Figure 1:
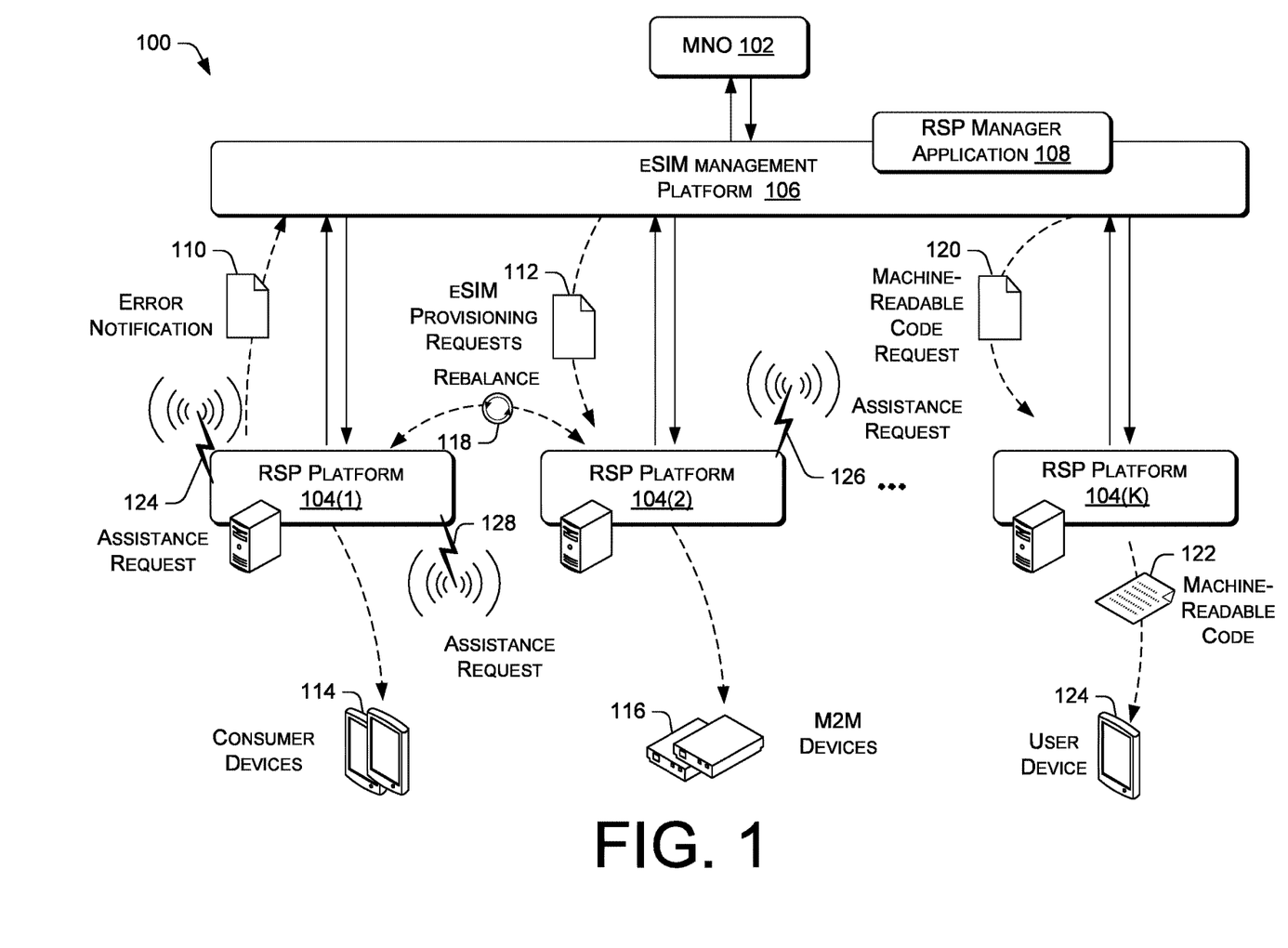
FIG. 1 illustrates an example architecture that enables an eSIM management platform and multiple remote SIM provisioning (RSP) platforms to provide intelligent SIM profile procurement.

FIG. 1 illustrates an example architecture 100 that enables an eSIM management platform and multiple remote SIM provisioning services (RSPs) to provide intelligent SIM profile procurement. The MNO 102 may provide a wide range of mobile communication services, as well as ancillary services and features, to subscribers and associated mobile device users. The MNO 102 may also be referred to as a mobile network operator (MNO). In various embodiments, the MNO 102 may provide wireless communication between multiple user devices. Further, the MNO 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The MNO 102 may be implemented using multiple interconnected networks. In various embodiments, the MNO 102 may include multiple Radio Access Networks (RANs). The RANs may be connected to each other via regional ground networks. In turn, the regional ground networks may be connected to a core network by a wide area network (WAN). Each regional portion of the MNO 102 may include one or more RANs and a regional circuit and/or packet switched network and associated signaling network facilities. The MNO 102 may provide telecommunication services in accordance with one or more technical standards, such as Enhanced Data Rates for GSM Evolution (EDGE), Wide-band Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the MNO 102 may be accessed via wired or wireless local area networks (LANs). For example, a wireless local area network may be a network that is established using Wi-Fi or Bluetooth standards and hardware.

A RAN of the MNO 102 may include a number of base stations, also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and a core network of the MNO 102. The core network may connect to a public packet data communication network, such as the Internet. Data and voice communications via the RANs, the core network, and the Internet may support a variety of telecommunication services through the MNO 102.

In various embodiments, 2G and/or 3G network components of the MNO 102 may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The LTE components of the MNO 102 may include an Evolved Packet Core (EPC) and an IP Multimedia Subsystem (IMS) core.

The MNO 102 may provide telecommunication services to multiple user devices, which may include consumer devices and M2M devices. Consumer devices are network-capable devices that are generally marketed to individual consumers and are capable of obtaining telecommunication and/or data communication services from the MNO 102. For example, these devices may include a smartphone, a tablet computer, a smartwatch, a gaming console. M2M devices are networked machines that use the telecommunication services provided by the wireless carrier to communicate with other devices. Each of the user devices may be equipped with an eUICC, i.e., an integrated circuit chip that is directly wired or soldered to a circuit board of the user device. The eUICC may store one or more eSIM profiles. Each eSIM profile may include information for accessing telecommunication services provided by a corresponding MNO, such as the MNO 102. Each user device may be further equipped with a modem that enables the user device to perform telecommunication and data communication with the MNO 102. Accordingly, the modem may encode digital information for transmission in uplink radio signals to the MNO 102, as well as decode digital information that is received from the MNO 102 via downlink radio signals.

The MNO 102 may use multiple RSP platforms 104(1)-104(K) to supply eSIM profiles to user devices. For example, a subscription manager of an RSP platform may send one or more data packets that contain an eSIM profile to the modem of a user device via an over-the-air (OTA) update. The data packets are assembled by the software of the modem into the eSIM profile and sent to the eUICC of the user device for installation in the eUICC. In various embodiments, each of the RSP platforms 104(1)-104(K) is responsible for the management of one or more sets of eSIM profiles that are provisioned to the eUICCs of user devices. Accordingly, each of the RSP platforms 104(1)-104(K) may include one or more subscriber managers. In some embodiments, each of the RSP platforms 104(1)-104(K) may include at least one Subscription Manager Data Preparation (SM-DP), at least one Subscription Manager Data Preparation Plus (SM-DP+), and at least one Subscription Manager Secure Routing (SM-SR).

The backend servers of the MNO 102 may provide an eSIM management platform 106. The eSIM management platform 106 may serve as a central interface between an operational function of the MNO 102 (e.g., operation support system (OSS), business support system (BSS), and/or so forth) and the RSP platforms 104(1)-104(K). In various embodiments, the eSIM management platform 106 may be an application program interface (API) abstraction layer that provides multiple APIs to the various entities, in which the entities may call the APIs to perform specific tasks. Accordingly, the eSIM management platform 106 enables the MNO 102 to manage eSIM profiles for deployment into eUICCs of user devices. For example, the eSIM management platform 106 may receive a request from the MNO 102 to provision an eUICC of a user device with an eSIM profile, delete an eSIM profile from the eUICC, or activate an eSIM profile that is stored in the eUICC for use to obtain communication services from an MNO. In turn, the eSIM management platform 106 may relay the request to the appropriate RSP platforms of the RSP platforms 104(1)-104(K) that is responsible for managing the eSIM profile. Following the completion of the request, the eSIM management platform 106 may provide a notification to the operational function of the MNO 102 indicating that the request has been fulfilled.

In various scenarios, eSIM management platform 106 may switch between various RSP platforms to provision eSIM profiles to the eUICCs of user devices under multiple conditions. Accordingly, the eSIM management platform 106 may be equipped with an RSP manager application 108 that manages and coordinates the switch between different RSP platforms. In one example, the RSP management application 108 may be notified by the RSP platform 104(1) via a notification 110 that the RSP platform 104(1) has experienced an error and is unable to process the eSIM profile provision requests. Accordingly, the RSP management application 108 may instead route future eSIM profile provisioning requests 112 to the RSP platform 104(2). In another example, the RSP management application 108 may detect an error in a batch of one or more eSIM profiles that are provided by the RSP platform 104(1). Thus, following the detection of the error, the RSP management application 108 may instead route further eSIM profile provisioning requests to the RSP platform 104(2).

In an additional scenario, the RSP platforms 104(1)-104(K) may include RSP platforms that are configured to provide eSIM profiles to different types of user devices. For example, the RSP platform 104(1) may specialize in provisioning consumer devices 114, while the RSP platform 104(2) may specialize in provisioning M2M devices 116. In another example, one RSP platform may specialize in provisioning eSIM profiles to user devices made by a first manufacturer, while another RSP platform may specialize in provisioning eSIM profiles to user devices made by a second manufacturer.

Accordingly, the different types of user devices that correspond to different RSP platforms may be distinguished by one or more factors, such as the user device manufacturer, the user device model, designated device use (e.g., consumer vs. M2M), the field of device use (e.g., vehicle fleet management, healthcare monitoring, telecommunication, etc.), originator of the eSIM provisioning request (e.g. MNO, a first third-party partner of the MNO, a second third-party partner of the MNO, etc.), and/or other factors.

In another scenario, the RSP management application 108 may initiate a rebalance 118 of the eSIM profile provisioning performed by one or more of the multiple RSP platforms 104(1)-104(K) when the quantity of eSIM profiles provisioned by a particular RSP platform reaches a threshold provisioning limit. In some instances, the threshold may be configured as a numerical rate (e.g., number of provisioning requests per hour). In other instances, the threshold may be configured as a percentage of total provisioning requests from the eSIM management platform 106, such as 25% of the total requests originated by the platform.

In additional instances, the threshold may be configured as a percentage of the total provisioning requests that are handled by a particular RSP platform for the eSIM management platform 106. For example, the RSP platform 104(1) may report to the RSP management application 108 that the amount of eSIM profile provisioning requests handled by the RSP platform 104(1) for the eSIM management platform 106 constitutes more than 10% of the total eSIM profile provisioning requests handled by the RSP platform 104. As a result, the RSP management application 108 may initiate the RSP platform 104(2) to handle future eSIM profile provisioning requests until the percentage of requests handled by the RSP platform 104(1) drops to 10% or below 10%. At such a point, the RSP management application may resume routing eSIM profile provisioning requests to the RSP platform 104(1).

In a further scenario, the RSP management application 108 may be configured to direct a specialized RSP platform, such as the RSP platform 104(K), to provide user devices with machine-readable codes that are redeemable for eSIM profiles rather than eSIM profiles. For example, the machine-readable codes may include Quick Response (QR) codes, Aztec Codes, and/or MaxiCodes. The machine-readable codes may be subsequently used by the user devices to obtain eSIM profiles for the eUICCs of user devices. For example, the RSP management application 108 may send a request 120 to RSP platform 104(K) for the platform to send a machine-readable code 122 to a user device 124. After receiving the machine-readable code 122, a Local Profile Assistant (LPA) application of the user device 124 may transmit the machine-readable code back to the RSP platform 104(K). In turn, the RSP platform 104(K) may send an eSIM profile that corresponds to the machine-readable code to the user device via an OTA update.

In other embodiments, multiple RSP platforms of the RSP platforms 104(1)-104(K) may be configured to cooperatively supply eSIM profiles to the eUICCs of the user devices that receive telecommunication services from an MNO. The multiple RSP platforms may be equipped with an RSP interface mechanism that enables the platforms to communicate with one another. The RSP interface mechanism may use a broadcast model or a publish-subscribe model for communication, in which the communication may be exchanged using the HyperText Transfer Protocol (HTTP) or the Message Queuing Telemetry Protocol (MQTT). For example, when the RSP platform 104(1) is unable to provision a user device with an eSIM profile, the RSP platform 104(1) may broadcast an assistance request 126 to multiple RSP platforms, such as the RSP platform 104(2) and the RSP platform 104(K). In response, the RSP platform 104(2) may answer the assistance request 126 to provision the eUICC of the user device instead. In another example, when the RSP platform 104(2) is running low on eSIM profiles, the RSP platform 104(2) may broadcast an assistance request 126 to multiple platforms, such as the RSP platform 104(1) and the RSP platform 104(K), in order to request a batch of eSIM profiles. In turn, the RSP platform 104(1) may respond to the assistance request and transfer the batch of eSIM profiles to the RSP platform 104(2). In an additional example, the RSP platform 104(1) may be unable to fulfill a particular request that is received from the eSIM management platform 106. The request may be to provision an eSIM profile to a particular type of user device. Alternatively, the request may be to provision a user device with a machine-readable code that can be used by the user device to acquire a corresponding eSIM profile. In such instances, the RSP platform 104(1) may broadcast an assistance request 128 to multiple RSP platforms, such as the RSP platforms 104(2) and the RSP platform 104(K). In turn, the RSP platform 104(K) may respond to the assistance request and render assistance to the RSP platform 104(1) by fulfilling the request on behalf of the RSP platform 104(1).

Example eSIM Management Platform

Figure 2:
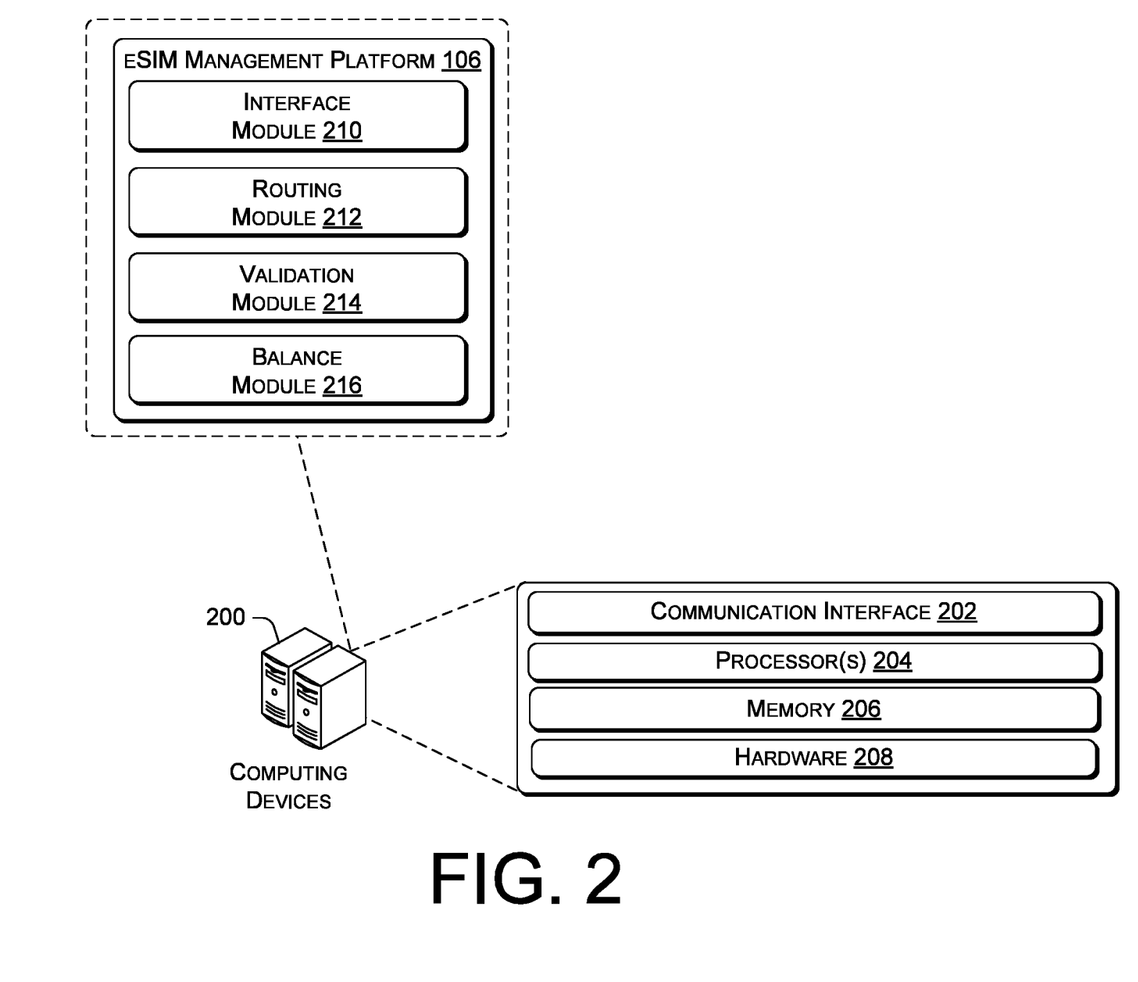
FIG. 2 is a block diagram showing various components of one or more illustrative computing devices that support an eSIM management platform that performs intelligent SIM profile procurement.

FIG. 2 is a block diagram showing various components of one or more illustrative computing devices that support an eSIM management platform that performs intelligent SIM profile procurement. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 200 or components thereof may be virtual computing devices in the form of virtual machines or software containers that are hosted in a computing cloud.

The computing devices 200 may implement the eSIM management platform 106. The implementation involves the execution of software, applications, and/or modules that include routines, program instructions, code segments, objects, and/or data structures that perform particular tasks or implement particular abstract data types. The eSIM management platform may include an interface module 210, a routing module 212, a validation module 214, and a balance module 216.

The interface module 210 may enable the eSIM management platform 106 to communicate with the operational function of the MNO 102. The interface module 210 may further enable the eSIM management platform 106 to communicate with an RSP platform via a standard protocol, such as the hypertext markup language protocol (HTTP). In some instances, the interface module 210 may call one or more Representational State Transfer (REST) APIs of the operational function or the RSP platform to perform operations. Alternatively, or concurrently, the interface module 210 may include one or more REST APIs that are callable by the operational function or the RSP platform to perform operations. Such operations may include routing requests from the MNO 102 to the RSP platforms 104(1)-104(K), receiving notifications from the RSP platforms 104(1)-104(K), and sending notifications to the operational function of the MNO 102.

The routing module 212 may route requests that are initiated by the operational function of the MNO 102 to an appropriate RSP platform of the RSP platforms 104(1)-104(1). For example, the requests may include requests to provision an eUICC of a user device with an eSIM profile, delete an eSIM profile from the eUICC, and activate an eSIM profile that is stored in the eUICC for use to obtain telecommunication services from an MNO. In turn, the eSIM management platform 106 may relay the requests to the appropriate RSP platforms of the RSP platforms 104(1)-104(K) that are responsible for managing the eSIM profile.

In some embodiments, the routing module 212 may receive a request to provision an eUICC of a user device with an eSIM profile. In turn, the routing module 212 may check a device database to determine a device type of the user device. For example, the request may include a device identifier of the user device, in which the device identifier may be an International Mobile Station Equipment Identity (IMEI), a Mobile Equipment Identifier (MEID), or some other electronic serial number (ESN) of the user device. Accordingly, the routing module 212 may query the device database with the device identifier to determine the device type of the user device. Subsequently, the routing module 212 may use an RSP platform function database to identify a particular RSP platform that is configured to handle eSIM profile provisioning for user devices of the device type. The request is then routed by the routing module 212 to the particular RSP platform for handling. In instances when there are multiple RSP platforms identified as being able to handle the provisioning for the device type, the routing module 212 may send the request to an identified RSP platform in round-robin fashion, to an identified RSP platform in a random fashion, or to an identified RSP platform of the identified RSP platforms that has the least amount of workload.

In other embodiments, the routing module 212 may receive a request to provide a user device with a machine-readable code that is redeemable by the user device for an eSIM profile. In turn, the routing module 212 may query the RSP platform function database to identify a particular RSP platform that is capable of providing the machine-readable code. In instances when there are multiple RSP platforms identified as being able to provide the machine-readable code, the routing module 212 may send the request to an identified RSP platform in round-robin fashion, to an identified RSP platform in a random fashion, or to an identified RSP platform of the identified RSP platforms that has the least amount of workload.

In some embodiments, the routing module 212 may direct an alternative RSP platform to provision an eSIM profile to a user device when an initial RSP platform fails to provision the eSIM profile to a user device in a predetermined period of time or following a predetermined number of provisioning attempts. For example, the initial RSP platform may have experienced a systematic failure that prevents the platform from performing the provisioning operations. In such a scenario, the initial RSP platform may notify the routing module 212. In turn, the routing module 212 may select and direct an alternative RSP platform to perform the provisioning operations until the initial RSP platform notifies the routing module 212 that it is able to resume operation.

The validation module 214 may sample eSIM profiles distributed by an RSP platform to validate that the sample eSIM profiles do not contain any errors. In some instances, the validation module 214 may periodically request an eSIM profile from an RSP platform for validation. In other instances, the validation module 214 may be triggered to automatically request an eSIM profile from an RSP platform for validation. The validation module 214 may be triggered in response to detecting that a predetermined number of user devices that have received eSIM profiles from the RSP platform within a recent period of time are unable to obtain telecommunication services from the MNO 102. Such detection may be based on user complaints that are reported to a customer service trouble ticket engine of the MNO 102 regarding user devices via telephone calls or chat messages, diagnostic data reported automatically sent by the user devices to a troubleshooting engine of the MNO 102, and/or so forth.

In some embodiments, the validation module 214 may execute a bitmapping analysis script to validate a particular eSIM profile. The script may compare the content (e.g., bitmap) of the particular eSIM profile to the content of a known functional eSIM profile of the same type. Thus, if the content of the two eSIM profile differ, the validation module 214 may determine that the particular eSIM profile contains an error and is corrupt. However, when the content of the eSIM profiles match, the validation module 214 may determine that the particular eSIM profile does not contain any errors. In other embodiments, the validation module 214 may determine that a current batch of eSIM profiles distributed by an RSP platform is corrupt when a predetermined number of user devices that have received eSIM profiles within a recent period of time from the RSP platform are unable to obtain telecommunication services from the MNO 102. In response to the detection of an error in an eSIM profile provided by an RSP platform or a determination that a batch of eSIM profile distributed by the RSP platform is corrupt, the validation module 214 may notify the routing module 212 to suspend the routing of eSIM provisioning requests to the RSP platform. The validation module 214 may further notify the RSP platform of the one or more corrupt eSIM profiles. Subsequently, the validation module 214 may receive a notification from the RSP platform indicating that the RSP platform has prepared a new batch of eSIM profiles or that eSIM profiles affected by the error have been fixed. In response, the validation module 214 may notify the routing module 212 to once again route the eSIM provisioning requests to the RSP platform.

The balance module 216 may rebalance the eSIM profile provisioning performed by the RSP platforms 104(1)-104(K). For example, when the quantity of eSIM profiles provisioned by a particular RSP platform reaches a threshold provisioning limit, the balance module 216 may direct the routing module 212 to suspend the routing of eSIM profile provisioning requests to particular RSP platform, and instead route the requests to an alternative RSP platform. Such rerouting may continue until the particular RSP platform reports to the balance module 216 that the quantity falls below the threshold provisioning limit. In this way, the amount of eSIM profiles provisioned may be balanced between the multiple RSP platforms.

Example RSP Platform

Figure 3:
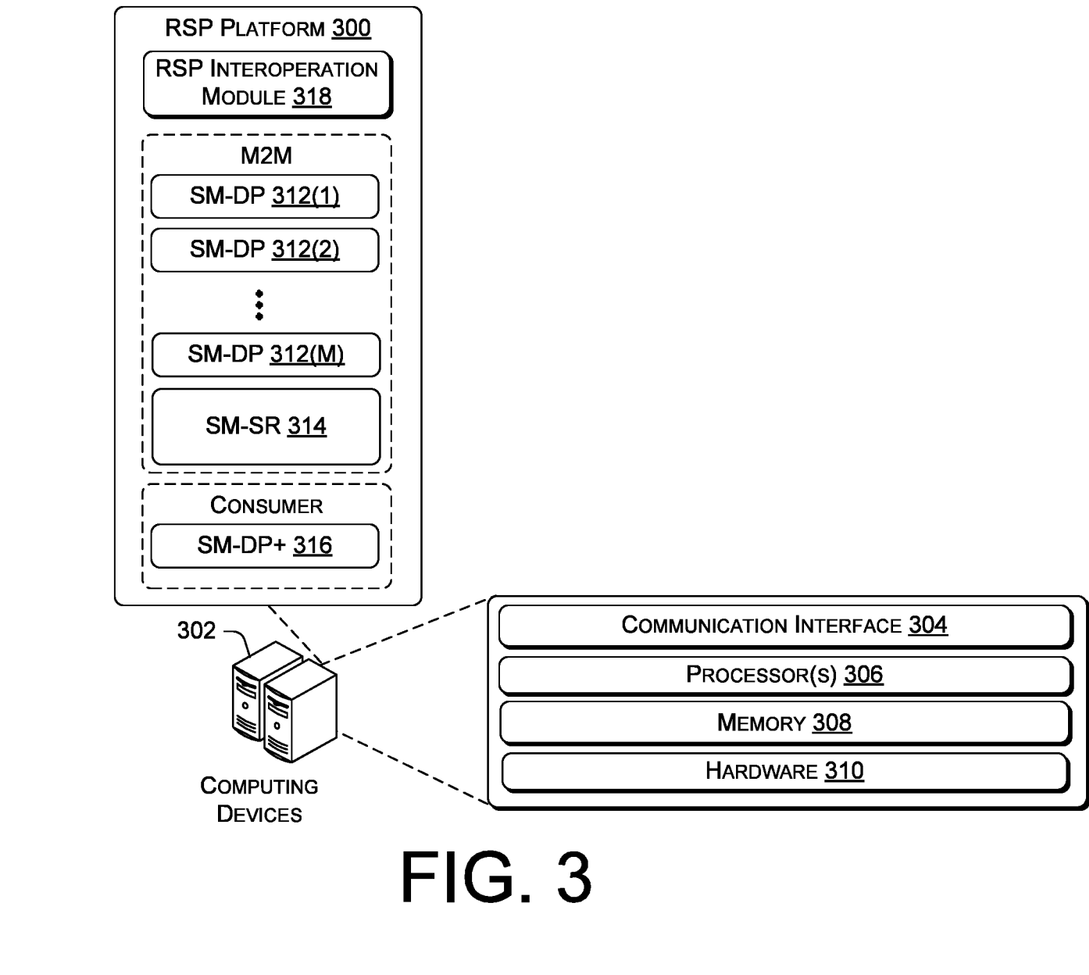
FIG. 3 is a block diagram showing various components implemented by one or more illustrative computing devices of the RSP platform for performing intelligent SIM profile procurement.

FIG. 3 is a block diagram showing various components implemented by one or more illustrative computing devices of the RSP platform 300 for performing intelligent SIM profile procurement. The RSP platform 300 may be implemented by one or more computing devices 302. The computing devices 302 may include a communication interface 304, one or more processors 306, memory 308, and hardware 310. The communication interface 304 may include wireless and/or wired communication components that enable the computing devices 302 to transmit data to and receive data from other networked devices. The hardware 310 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 302 or components thereof may be virtual computing devices in the form of virtual machines or software containers that are hosted in a computing cloud. The RSP platform 300 may include SM-DPs 312(1)-312(M), a SM-SR 314, a SM-DP+ 316, and an RSP interoperation module 318. These software components may be implemented using routines, program instructions, objects, and/or data structures that are executed by the processors 306 to perform particular tasks or implement particular abstract data types.

The eSIM profiles for M2M device, also referred to as M2M eSIM profiles, may be loaded into the profile data stores of SM-DPs 312(1)-312(M). In various instances, the profile data stores of each of the SM-DPs 312(1)-312(M) may hold M2M eSIM profiles that are ordered by a single entity or different entities. For example, a profile data store of the SM-DP 312(1) may hold the M2M eSIM profiles for the MNO 102, while a profile data store of the SM-DP 312(M) may hold the M2M eSIM profiles for a third-party partner of the MNO 102. In another example, a profile data store of the SM-DP 312(1) may hold the M2M eSIM profiles for the MNO 102, but a profile data store belonging to each of the SM-DP 312(2) and 312(M) may hold the M2M eSIM profiles for a respective third-party partner of the MNO 102. However, in other instances, a profile data store of a SIM-DP may be configured to hold M2M eSIM profiles of multiple entities.

Along with the loading of the M2M eSIM profiles into one or more SM-DPs, M2M eUICC ID (EIDs) of eUICCs that are for use by the M2M devices are loaded into a data store of the SM-SR 314. Accordingly, the M2M eSIM profiles may be eventually deployed on these eUICCs. On the other hand, the eSIM profiles for consumer devices, also referred to as consumer eSIM profiles, may be loaded into profile state stores of a SM-DP+, such as the SM-DP+ 316. In some instances, each profile data store of the SM-DP+ 316 may hold consumer eSIM profiles of a single entity. In other instance, a single profile data store of the SM-DP+ 316 may hold eSIM profiles of multiple different entities. Further, while the RSP platform 300 is illustrated as having a single SM-DP+ 316, the service may be configured with multiple SM-DP+s in other embodiments. In such embodiments, each SM-DP+ is responsible for managing the consumer eSIM profiles of a different entity, or the multiple SM-DP+s can collectively manage consumer eSIM profiles of a single entity. Thus, the SM-DPs 312(1)-312(M) and the SM-DP+ 316 may distribute eSIM profiles to user devices in response to requests from the eSIM management platform 106.

The RSP interoperation module 318 may provide an interface mechanism to enable the RSP platform 300 to communicate with other RSP platforms. The interface mechanism may use a broadcast model or a publish-subscribe model for communication, in which the communication may be exchanged using HTTP or MQTT. For example, when the RSP platform 300 is unable to provision a user device with an eSIM profile, the RSP interoperation module 318 may broadcast an assistance request to multiple RSP platforms. The assistance request may request that another RSP platform provision the eUICC of the user device instead. The assistance request may include an identifier of the RSP platform making the assistance request, a device identifier of the user device, a device type of the user device, carrier identification information for the MNO 102, the nature of the assistance request, and/or other information. In turn, one of the multiple RSP platforms may respond to the assistance request and provision the eUICC of the user device. In some instances, the responding RSP platform may broadcast a notification that the responding RSP platform is fulfilling the assistance request to a group of RSP platforms that includes the RSP platform 300. In this way, one or more RSP platforms in the group of RSP platforms may be notified to stop responding to the assistance request.

In alternative embodiments, the RSP interoperation module 318 may broadcast an assistance request in other circumstances. One circumstance may be the RSP interoperation module 318 being notified by a subscription manager of the RSP platform 300 that an amount of eSIM provisioning requests handled by the subscription manager exceeds a predetermined threshold. Another circumstance may be the RSP interoperation module 318 being notified by a subscription manager of the RSP platform 300 that an overall amount of eSIM provisioning requests handled by the subscription manager exceeded a predetermined threshold. A further circumstance may be that the RSP interoperation module 318 is notified that a subscription manager of the RSP platform 300 has experienced an error and is unable to continue to provide eSIM profiles to user devices. Thus, the RSP interoperation module 318 may broadcast an assistance request to multiple RSP platforms requesting that another RSP platform take over the duties of the RSP platform 300. In this way, an RSP platform may respond to such assistance requests to perform the tasks on behalf of the RSP platform 300. In some instances, the responding RSP platform may broadcast a notification that the responding RSP platform is fulfilling the assistance request to a group of RSP platforms that includes the RSP platform 300. In this way, one or more RSP platforms in the group of RSP platforms may be notified to stop responding to the assistance request. Conversely, the RSP interoperation module 318 may receive similar assistance requests from other RSP platforms and respond to such assistance requests by distributing eSIM profiles to user device on behalf of the other RSP platforms. Once a particular RSP platform has successfully fulfilled an eSIM provisioning task on behalf of a requesting RSP platform, the particular RSP platform may send a notification to the requesting RSP platform. Otherwise, the particular RSP platform may retry for a predetermined number of times before notifying the requesting RSP platform that the task has failed.

In another example, when the RSP platform 300 is running low on eSIM profiles, the RSP interoperation module 318 may broadcast an assistance request to multiple RSP platforms in order to request a batch of eSIM profiles from another RSP platform. For example, the RSP interoperation module 318 may be notified by a subscription manager of the RSP platform 300 that a stock of eSIM profiles has fallen below a predetermined stock threshold. In turn, another RSP platform may respond to the assistance request and transfer the batch of eSIM profiles to the RSP platform 300. In some instances, the responding RSP platform may broadcast a notification that the RSP platform is fulfilling the assistance request to a group of RSP platforms that includes the RSP platform 300. In this way, one or more RSP platforms in the group of RSP platforms may be notified to stop responding to the assistance request. Conversely, the RSP interoperation module 318 may receive similar assistance requests from other RSP platforms and respond to such assistance requests by distributing batches of eSIM profiles to the other RSP platforms.

In other instances, the RSP platform 300 may receive a request from the eSIM management platform 106, in which the RSP platform 300 is unable to fulfill the request. For example, the RSP platform 300 may receive a request to provide a machine-readable code that is redeemable for an eSIM profile to a user device when the RSP platform 300 is not configured to provide such code. Accordingly, the RSP interoperation module 318 may broadcast an assistance request to multiple RSP platforms. In this way, a compatible RSP platform may respond to the assistance request and takeover provisioning the machine-readable code to the user device, as well as eventually fulfilling the redemption of the machine-readable code for a corresponding eSIM profile. In some instances, the compatible RSP platform may broadcast a notification that the compatible RSP platform is fulfilling the assistance request to a group of RSP platforms that includes the RSP platform 300. In this way, one or more RSP platforms in the group of RSP platforms may be notified to stop responding to the assistance request. In alternative embodiments in which the RSP interoperation module 318 is implemented using a publish-subscribe model, the broadcasts may be similarly performed with respect to specific subscriber RSP platforms which have elected to receive broadcasts from the RSP interoperation module 318, and vice versa.

In other alternative embodiments, the RSP interoperation module 318 of the RSP platform 300 may be configured to directly request assistance from a particular RSP platform. The RSP interoperation module 318 may transmit the request using HTTP or MQTT. For example, when the RSP platform 300 is unable to provision a user device with an eSIM profile, the RSP interoperation module 318 may send an assistance request to another RSP platform to request that the other RSP platform provision the eUICC of the user device instead. In such an example, the RSP interoperation module 318 may query an RSP database to determine one or more compatible RSP platforms that are capable of providing eSIM profiles to the user devices of the same device type. The RSP database may be a database that is accessible to the RSP platform 300 or a common database that is accessible to multiple RSP platforms. The RSP interoperation module 318 may be notified by a subscription manager of the RSP platform 300 that the subscription manager is unable to provision eSIM profiles to user devices. In turn, the RSP interoperation module 318 may use the RSP database to identify a compatible RSP platform and send an assistance request to the compatible RSP platform. In this way, the compatible RSP platform may take over and perform the provisioning of the eSIM profiles to the user devices. Conversely, the RSP interoperation module 318 may receive similar assistance requests from other RSP platforms and respond to such assistance requests by distributing eSIM profiles to user device on behalf of the other RSP platforms. In alternative embodiments, the RSP interoperation module 318 may send the assistance request in other circumstances. One circumstance may be the RSP interoperation module 318 being notified by a subscription manager of the RSP platform 300 that an amount of eSIM provisioning requests handled by the subscription manager exceeds a predetermined threshold. Another circumstance may be the RSP interoperation module 318 being notified by a subscription or that an overall amount of eSIM provisioning requests handled by the subscription manager exceeded a predetermined threshold. Once a particular RSP platform has successfully fulfilled an eSIM provisioning task on behalf of a requesting RSP platform, the particular RSP platform may send a notification to the requesting RSP platform. Otherwise, the particular RSP platform may retry for a predetermined number of times before notifying the requesting RSP platform that the task has failed.

In another example, when the RSP platform 300 is running low on eSIM profiles, the RSP interoperation module 318 may send an assistance request to another RSP platform in order to request a batch of eSIM profiles from the other RSP platform. In turn, the other RSP platform 104 may transfer the batch of eSIM profiles to the RSP platform 300. In such an example, the RSP interoperation module 318 may be notified by a subscription manager of the RSP platform 300 that a stock of eSIM profiles has fallen below a predetermined stock threshold. In turn, the RSP interoperation module 318 may use the RSP database to identify a compatible RSP platform and send an assistance request for a supply of eSIM profiles to the compatible RSP platform. Conversely, the RSP interoperation module 318 may receive similar assistance requests from other RSP platforms and respond to such assistance requests by distributing batches of eSIM profiles to the other RSP platforms.

In other instances, the RSP platform 300 may receive a request from the eSIM management platform 106, in which the RSP platform 300 is unable to fulfill the request. For example, the RSP platform 300 may receive a request to provide a machine-readable code that is redeemable for an eSIM profile to a user device when the RSP platform 300 is not configured to provide such code. The RSP interoperation module 318 may query the RSP database to identify a particular RSP platform that is capable of providing such machine-readable codes. Accordingly, the RSP interoperation module 318 may send an assistance request to the particular RSP platform. In this way, the compatible RSP platform may take over and perform the provisioning of the machine-readable code to the user device.

Example Processes

Figure 4:
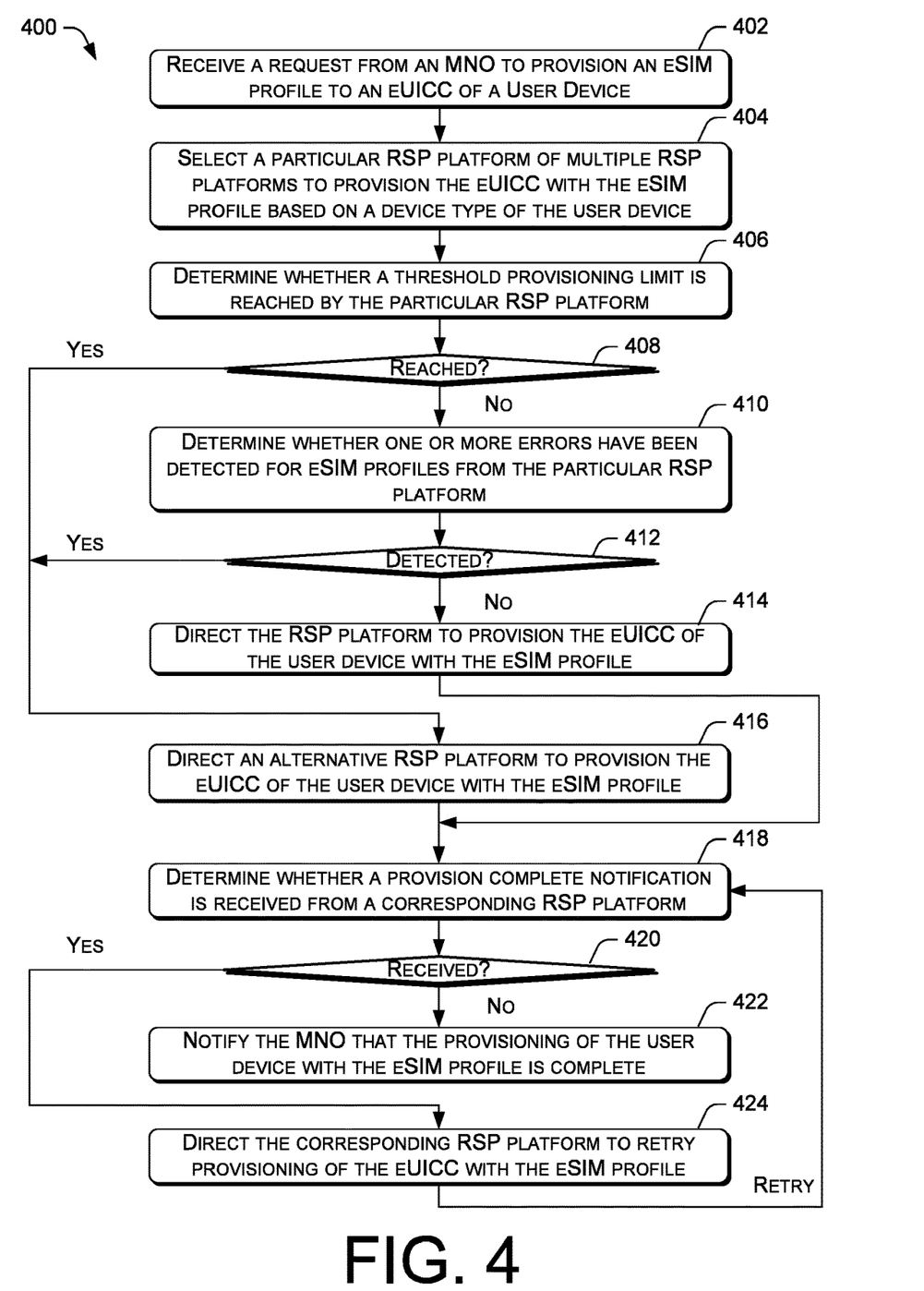
FIG. 4 is a flow diagram of an example process for an eSIM management platform to perform intelligent profile procurement.
Figure 5:
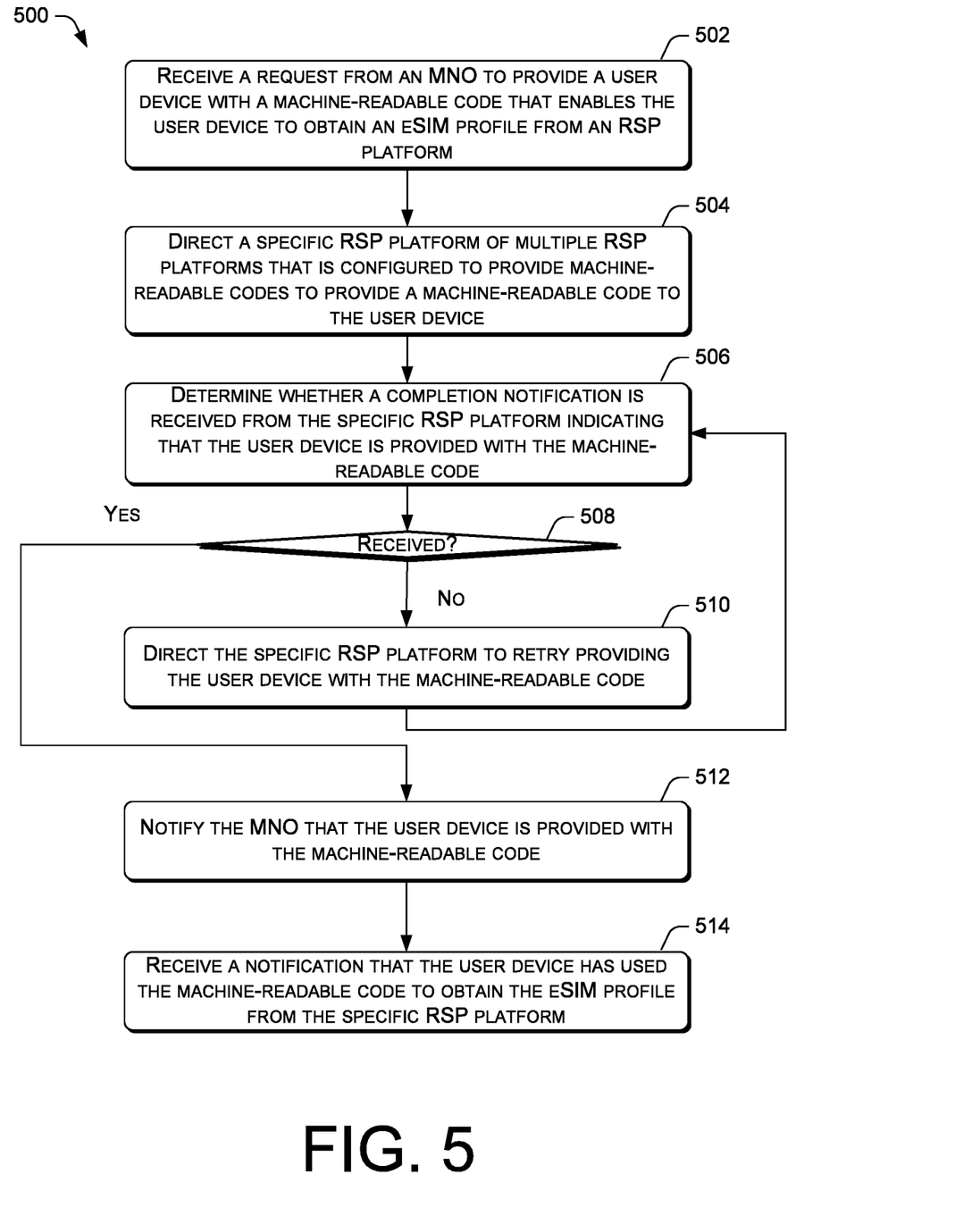
FIG. 5 is a flow diagram of an example process for the eSIM management platform to perform machine-readable code-based profile procurement.
Figure 6:
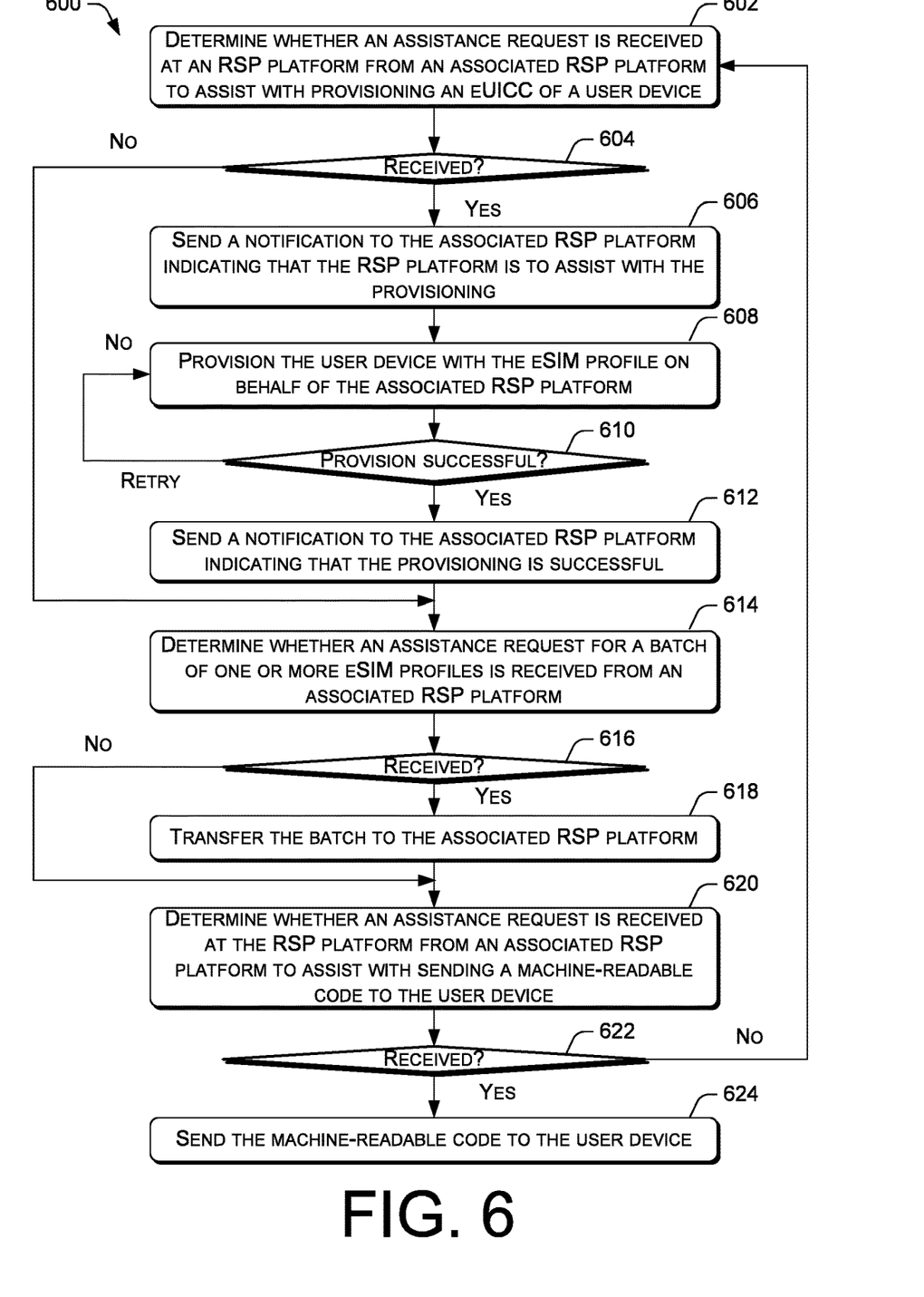
FIG. 6 is a flow diagram of an example process for multiple RSP platforms to cooperatively perform intelligent profile procurement.

FIGS. 4-6 present illustrative processes 400-600 for performing intelligent SIM profile procurement. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIG. 4 is a flow diagram of an example process 400 for an eSIM management platform to perform intelligent profile procurement. At block 402, the eSIM management platform 106 may receive a request from the MNO 102 to provision an eSIM profile to an eUICC of a user device. In various embodiments, the request may originate from an operational function of the MNO 102, such as from an OSS or a BSS of the MNO 102. At block 404, the eSIM management platform 106 may select a particular RSP platform of multiple RSP platforms to provision the eUICC with the eSIM profile based on a device type of the user device. In various embodiments, the device type of the user device may be determined by on one or more factors, such as the user device manufacturer, the user device model, designated device use (e.g., consumer vs. M2M), the field of device use (e.g., vehicle fleet management, healthcare monitoring, telecommunication, etc.), originator of the eSIM provisioning request (e.g. MNO, a first third-party partner of the MNO, a second third-party partner of the MNO, etc.), and/or other factors.

At block 406, the eSIM management platform 106 may determine whether a threshold provisioning limit is reached by the particular RSP platform. For example, the limit may be a predetermined threshold for an amount of eSIM provisioning requests handled by a subscription manager of the eSIM management platform 106. In some instances, the predetermined threshold may be configured as a numerical rate (e.g., number of provisioning requests per hour). In other instances, the threshold may be configured as a percentage of total provisioning requests from the eSIM management platform 106, such as 25% of the total requests originated by the platform.

At decision block 408, if the eSIM management platform 106 determines that the threshold provisioning limit is not reached ("no" at decision block 408), the process 400 may proceed to block 410. At block 410, the eSIM management platform 106 may determine whether one or more errors have been detected for eSIM profiles from the particular RSP platform. In various embodiments, the one or more errors may be detected via bitmap testing of eSIM profiles and/or user reported information regarding problems with user devices. At decision block 412, if the eSIM management platform 106 determines that no errors have been detected ("no" at decision block 412), the process 400 may proceed to block 414. At block 414, the eSIM management platform 106 may direct the RSP platform to provision the eUICC of the user device with the eSIM profile. The eSIM management platform 106 may communicate with the particular RSP platform via a standard protocol, such as the hypertext markup language protocol (HTTP).

Returning to decision block 408, if the eSIM management platform 106 determines that the threshold provisioning limit is reached ("yes" at decision block 408), the process 400 may proceed to block 416. At block 416, the eSIM management platform 106 may direct an alternative RSP platform to provision the eUICC of the user device with the eSIM profile. In various embodiments, the eSIM management platform 106 may use an RSP database to select the alternative RSP platform that is compatible with the RSP platform. Returning to decision block 412, if the eSIM management platform 106 determines that one or more errors have been detected for eSIM profiles from the particular RSP platform ("yes" at decision block 412), the process 400 may also proceed to block 416.

At block 418, the eSIM management platform 106 may determine whether a provision complete notification is received from a corresponding RSP platform. At decision block 420, if the eSIM management platform 106 determines that such a complete notification is received ("yes" at decision block 420), the process 400 may proceed to block 422. At block 422, the eSIM management platform 106 may notify the MNO 102 that the provisioning of the user device with the eSIM profile is complete.

Returning to decision block 420, if the eSIM management platform 106 determines that the no complete notification is received within a predetermined period of time ("no" at decision block 420), the process 400 may proceed to block 424. At block 424, the eSIM management platform 106 may direct the corresponding RSP platform to retry provisioning of the eUICC. In various embodiments, the corresponding RSP platform may be directed to retry the provisioning of the eUICC with the eSIM profile for a predetermined number of times.

FIG. 5 is a flow diagram of an example process 500 for the eSIM management platform to perform machine-readable code-based profile procurement. At block 502, the eSIM management platform 106 may receive a request from the MNO 102 to provide a user device with a machine-readable code that enables the user device to obtain an eSIM profile from an RSP platform for installation in an eUICC of the user device. For example, the machine-readable codes may include Quick Response (QR) codes, Aztec Codes, and/or MaxiCodes.

At block 504, the eSIM management platform 106 may direct a specific RSP platform of multiple platforms that is configured to provide machine-readable codes to provide a machine-readable code to the user device. In various embodiments, the eSIM management platform 106 may use an RSP database to identify the specific RSP platform as having the ability to provide machine-readable codes and handle the redemption of machine-readable codes for eSIM profiles. The eSIM management platform 106 may communicate with the specific RSP platform via a standard protocol, such as the hypertext markup language protocol (HTTP). At block 506, the eSIM management platform 106 may determine whether a completion notification is received from the specific RSP platform indicating that the user device is provided with the machine-readable code. At decision block 508, if the completion notification is not received ("no" at block 506), the process 500 may proceed to block 510.

At block 510, the eSIM management platform 106 may direct the specific RSP platform to retry providing the user device with the machine-readable code. In various embodiments, the RSP platform may be directed to retry for a predetermined number of times before sending a notification to the eSIM management platform 106 indicating that the provision of the machine-readable code has failed. However, if the completion notification is received ("yes" at decision block 506), the process 500 may proceed to block 512. At block 512, the eSIM management platform 106 may notify the MNO 102 that the user device is provided with the machine-readable code. At block 514, the eSIM management platform 106 may receive a notification that the user device has used the machine-readable code to obtain the eSIM profile from the specific RSP platform.

FIG. 6 is a flow diagram of an example process 600 for multiple RSP platforms to cooperatively perform intelligent profile procurement. At block 602, an RSP platform may determine whether an assistance request is received from an associated RSP platform to assist with provisioning an eUICC of a user device. The associated RSP platform may serve the same MNO as the RSP platform. In some embodiments, the assistance request may be broadcasted by the associated RSP platform to multiple RSP platforms under a broadcast model or a publish-subscribe model. In other embodiments, the assistant request may be sent directly by the associated RSP platform to the RSP platform.

At decision block 604, if the assistance request is received by the RSP platform ("yes" at decision block 604), the process 600 may proceed to block 606. At block 606, the RSP platform may send a notification to the associated RSP platform indicating that the RSP platform is to assist with the provisioning. In various embodiments, the RSP platform and the associated RSP platform may exchange communications using the HyperText Transfer Protocol (HTTP) or the Message Queuing Telemetry Protocol (MQTT).

At block 608, the RSP platform may provision the user device with the eSIM profile on behalf of the associated RSP platform. At decision block 610, the RSP platform may determine whether the provisioning of the user device with the eSIM profile was successful. If the provisioning is successful ("yes" at decision block 610), the process 600 may proceed to block 612. At block 612, the RSP platform may send a notification to the associated RSP platform indicating that the provisioning is successful. Subsequently, the process 600 may proceed to block 614. However, if the provisioning is not successful at decision block 610), the process 600 may return to block 608 so that another attempt at provisioning the user device with the eUICC is retried. In various embodiments, the RSP platform may perform a retry of the provisioning for a predetermined number of times before finally notifying the associated RSP platform that the provisioning is not successful. In turn, the associated RSP platform may notify the MNO 102 that the provisioning of the user device with the eSIM profile has failed. In alternative embodiments, the assistance request may be a request by the associated RSP platform for the RSP platform to take over the provisioning of eSIM profiles to multiple user devices until the associated RSP platform sends another request for the RSP platform to terminate such operations. For example, the associated RSP platform may make such an assistance request if the associated RSP platform experiences a systematic failure in its ability to distribute eSIM profiles.

Returning to decision block 604, if the RSP platform did not receive an assistance request to provision a user device with an eSIM profile, the process 600 may proceed directly to block 614. At block 614, the RSP platform may determine whether an assistance request for a batch of one or more eSIM profiles is received from an associated RSP platform. In various embodiments, the associated RSP platform may detect that an amount of available eSIM profiles may have fallen below a threshold and send out the assistance request. In some embodiments, the assistance request may be broadcasted by the associated RSP platform to multiple RSP platforms under a broadcast model or a publish-subscribe model. In other embodiments, the assistant request may be sent directly by the associated RSP platform to the RSP platform.

At decision block 616, if the assistance request is received at the RSP platform ("yes" at the decision block 616), the process 600 may proceed to block 618. Subsequently, the process 600 may proceed to block 620. At block 618, the RSP platform may transfer the batch to the associated RSP platform. However, if the assistance request is not received at the RSP platform ("no" at decision block 616), the process 600 may proceed directly to block 620. At block 620, the RSP platform may determine whether an assistance request is received from an associated RSP platform to assist with sending a machine-readable code to the user device. In various embodiments, the RSP platform may be a platform that is capable of handling the distribution of machine-readable codes to user devices and the provision of eSIM profiles to user devices in exchange for machine-readable codes. In some embodiments, the assistance request may be broadcasted by the associated RSP platform to multiple RSP platforms under a broadcast model or a publish-subscribe model. In other embodiments, the assistant request may be sent directly by the associated RSP platform to the RSP platform.

At decision block 622, if the assistance request is received by the RSP platform ("yes" at decision block 622), the process 600 may proceed to block 624. At block 624, the RSP platform may send the machine-readable code to the user device. In various embodiments, the RSP platform may try to resend the machine-readable code for a predetermined number of attempts if the initial send attempt fails. However, if these attempts fail, the RSP platform may notify the associated RSP platform of the failure. In turn, the associated RSP platform may notify the MNO that made the initial request to provision a user device with the machine-readable code. Returning to decision block 622, if the assistance request is not received by the RSP platform ("no" at decision block 622), the process 600 may loop back to block 602.

The ability of the eSIM management platform to use multiple RSP platforms to perform intelligent SIM procurement may ensure that an eSIM profile is always available for provisioning to the eUICC of a user device. Such availability may reduce or eliminate eSIM provisioning errors that arise due to RSP platform failure or downtime, corruption of eSIM profile batches, a lack of available eSIM profiles of particular types from a specific RSP platform, and/or other occurrences.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving a request from a mobile network operator (MNO) to provide an embedded Subscriber Identity Module (eSIM) profile to an embedded Universal Integrated Circuit Card (eUICC) of a user device that is to receive telecommunication services from the MNO;
   in response to determining that a particular remote SIM provisioning (RSP) platform of a plurality of RSP platforms is able to provide the eSIM profile, directing the particular RSP platform to provision the eUICC of the user device with the eSIM profile; and
   in response to detection of a condition that affects an ability of the particular RSP platform to provide the eSIM profile, directing an alternative RSP platform of the plurality RSP platforms to provision the eUICC of the user device with the eSIM profile, wherein the condition is one of detecting that a number of eSIM profiles provisioned by the particular RSP platform in a time period have reached a threshold limit, detecting via a bitmapping analysis that a batch of one or more eSIM profiles of the particular RSP platform is corrupt, or detecting that the particular RSP platform failed to provision the eUICC of the user device with the eSIM profile in a predetermined period of time or following a predetermined number of provisioning attempts.

2. The one or more non-transitory computer-readable media of claim 1, wherein the acts further comprise:
   receiving a notification from the alternative RSP platform indicating that provisioning of the eSIM profile to the eUICC of the user device is successful; and
   notifying the MNO that the provisioning of the eSIM profile to the eUICC of the user device is successful.

3. The one or more non-transitory computer-readable media of claim 1, wherein the directing the particular RSP platform includes:
   determining a device type of the user device based on information in a device type database,
   in response to determining that the particular RSP platform is configured to provide eSIM profiles for user devices of the device type, selecting the particular RSP platform to provide the eSIM profile to the user device; and
   sending a notification that directs the particular RSP platform to provision the eUICC of the user device with the eSIM profile.

4. The one or more non-transitory computer-readable media of claim 3, wherein the device type of the user device is determined based on one or more of user device manufacturer, user device model, designated device user, or originator of the request.

5. The one or more non-transitory computer-readable media of claim 1, wherein directing the alternative RSP platform rebalances percentages of eSIM profile provisions handled by the RSP platform and the alternative RSP platform.

6. The one or more non-transitory computer-readable media of claim 1, where the acts further comprise:
   receiving an additional request from the MNO to provide an additional user device with a machine-readable code that enables the additional user device to obtain an additional eSIM profile for installation in an additional eUICC of the additional user device;
   determining that the particular RSP platform of the plurality of RSP platforms is incapable of providing the machine-readable code to the additional user device; and
   directing another RSP platform of the plurality of RSP platform to provide the machine-readable code to the additional user device.

7. The one or more non-transitory computer-readable media of claim 6, wherein the acts further comprise receiving a notification from the particular RSP platform that the user device has used the machine-readable code to obtain the additional eSIM profile from the particular RSP platform.

8. A computer-implemented method, comprising:
   receiving, at a remote SIM provisioning (RSP) platform that provisions embedded Subscriber Identity Module (eSIM) profiles to the embedded Universal Integrated Circuit Cards (eUICCs) of user devices, a request from an associated RSP platform to assist with provisioning an eUICC of a user device with an eSIM profile on behalf of a mobile network operator (MNO);
   sending, by the RSP platform, a notification to the associated RSP platform indicating that the RSP platform is to assist with the provisioning of the eUICC of the user device with the eSIM profile; and
   provisioning, via the RSP platform, the eUICC of the user device with the eSIM profile, the eSIM profile configuring the user device to receive telecommunication services from the MNO.

9. The computer-implemented method of claim 8, further comprising sending, by the RSP platform, an additional notification indicating that the provision of the eUICC of the user device with the eSIM profile is complete.

10. The computer-implemented method of claim 8, further comprising:
    receiving, at the RSP, an additional request from the associated RSP for a batch of one or more eSIM profiles that configure user devices to receive telecommunication services from the MNO; and
    in response to the additional request from the associated RSP, transferring the batch of one or more eSIM profiles to the associated RSP.

11. The computer-implemented method of claim 8, wherein the at least one of the receiving the request or the sending the notification includes using HyperText Transfer Protocol (HTTP) or Message Queuing Telemetry Protocol (MQTT) to send the request or the notification.

12. The computer-implemented method of claim 8, wherein the request is broadcasted by the associated RSP platform to a plurality of RSP platforms that service the MNO via a broadcast model or a publish-subscribe model.

13. The computer-implemented method of claim 8, further comprising:
    receiving, at the RSP, an additional request from the associated RSP to provide an additional user device with a machine-readable code that enables the additional user device to obtain an additional eSIM profile for installation in an additional eUICC of the additional user device; and
    in response to the additional request from the associated RSP, providing the additional user device with the machine-readable code.

14. A management platform, comprising:
    one or more processors; and
    memory including a plurality of computer-executable components that are executable by the one or more processors to perform a plurality of actions, the plurality of actions comprising:
       receiving a request from mobile network operator (MNO) to provide a user device that is to receive telecommunication services from the MNO with a machine-readable code that enables the user device to obtain an embedded Subscriber Identity Module (eSIM) profile for installation in an eUICC of the user device;
       determining that a particular remote SIM provisioning (RSP) platform of a plurality of RSP platforms is capable of providing the machine-readable code to the user device; and
       directing the particular RSP platform of the plurality of RSP platform to provide the machine-readable code to the user device.

15. The management platform of claim 14, wherein the machine-readable code is used by a Local Profile Assistant (LPA) of the user device to request the eSIM profile from the particular RSP platform for installation in the eUICC of the user device.

16. The management platform of claim 14, wherein the machine-readable code is a Quick Response (QR) code.

17. The management platform of claim 14, wherein the actions further comprise:
    receiving an additional request from the MNO to provide an additional eSIM profile to an additional eUICC of an additional user device that is to receive telecommunication services from the MNO;
    in response to determining that additional RSP platform of the plurality of RSP platforms is able to provide the additional eSIM profile, directing the additional RSP platform to provision the additional eUICC of the additional user device with the additional eSIM profile; and
    in response to detection of a condition that affects an ability of the additional RSP platform to provide the additional eSIM profile, directing an alternative RSP platform of the plurality RSP platforms to provision the additional eUICC of the additional user device with the additional eSIM profile.

18. The management platform of claim 17, wherein the condition is a detection that a number of eSIM profiles provisioned by the additional RSP platform in a time period have reached a threshold limit.

19. The management platform of claim 17, wherein the condition is a detection via a bitmapping analysis that a batch of one or more eSIM profiles of the additional RSP platform is corrupt.

20. The management platform of claim 17, wherein the condition is a detection that the additional RSP platform failed to provision the eUICC of the user device with the eSIM profile in a predetermined period of time or following a predetermined number of provisioning attempts.

* * * * *